(12) United States Patent
Olson

(10) Patent No.: US 6,606,031 B2
(45) Date of Patent: *Aug. 12, 2003

(54) METHOD FOR DISPLAYING WARRANTY INFORMATION

(75) Inventor: Donald D. Olson, Plymouth, MI (US)

(73) Assignee: Ford Motor Company, Dearborn, MI (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 66 days.

(21) Appl. No.: 09/540,328

(22) Filed: Mar. 31, 2000

(65) Prior Publication Data

US 2003/0028403 A1 Feb. 6, 2003

(51) Int. Cl.[7] ................................................. G08B 5/00
(52) U.S. Cl. ............................. 340/815.65; 340/691.1; 340/691.6; 705/4
(58) Field of Search ......................... 340/815.65, 425.5, 340/438, 439, 441, 442, 449, 450, 691.1, 691.6, 615.56; 705/1, 7, 10, 11, 500, 12, 22, 28, 29, 4, 30; 701/29, 30, 35; 235/382.2; 714/1

(56) References Cited

U.S. PATENT DOCUMENTS

| | | | | |
|---|---|---|---|---|
| 5,313,392 A | * | 5/1994 | Temma et al. | 364/401 |
| 5,956,691 A | * | 9/1999 | Powers | 705/4 |
| 5,956,693 A | * | 9/1999 | Geerlings | 705/14 |
| 5,974,388 A | * | 10/1999 | Durham | 705/1 |
| 5,978,774 A | * | 11/1999 | Rogers et al. | 705/24 |
| 6,085,172 A | * | 7/2000 | Junger | 705/28 |
| 6,088,030 A | * | 7/2000 | Bertram et al. | 345/349 |
| 6,182,048 B1 | * | 1/2001 | Osborn et al. | 705/4 |
| 6,370,511 B1 | * | 4/2002 | Dang | 705/3 |

* cited by examiner

Primary Examiner—Benjamin C. Lee
(74) Attorney, Agent, or Firm—F. G. McKenzie

(57) ABSTRACT

A method 10 for displaying warranty information by use of a display of indicators 72, 74 having one of a variety of colors. Various item function groups 68, 70 are created and each function group has a certain indicator 72, 74. The color of each indicator 72, 74 is based upon the number of warranty claims received for the unique function group 68, 70 to which each indicator 72, 74 respectively pertains. These selectively colored indicators 72, 74 allow a user of the methodology 10 to be quickly and efficiently warned of the existence of an undesirably high amount of warranty claims.

15 Claims, 2 Drawing Sheets

METHOD FOR DISPLAYING WARRANTY INFORMATION

FIELD OF THE INVENTION

This invention generally relates to a method for displaying warranty information and more particularly to a method for allowing selective access to warranty information while concomitantly providing a visual warning indicator in the event that the warranty information evidences the existence of potentially undesirable product characteristics and/or attributes.

BACKGROUND OF THE INVENTION

Warranty information generally includes relatively detailed data concerning alleged malfunctions and/or complaints about one or more products. Typically, a manufacturer or supplier of these products frequently desires to analyze this information in order to evaluate these concerns, to monitor the overall quality of the produced products, and to determine whether these products include undesirable attributes and/or characteristics. Moreover, many manufacturers desire to periodically view the amount and type of such claims in order to ensure that the overall quality of the products remains acceptable and/or to determine the cause of these complaints. Particularly, once the cause of the complaints has properly been identified, certain portions of the product manufacturing process may then be modified in order to eliminate these undesirable product attributes and/or characteristics. Certain components may also be replaced and/or modified to achieve a similar objective.

Hence, it is desirable to quickly determine whether a relatively large amount of warranty claims or complaints about a product have been received in order that a manufacturer or provider of the product may quickly ascertain whether the product has certain undesirable features or characteristics, and in order to allow the manufacturer to quickly modify the product in order to eliminate these undesirable features or characteristics.

While some methods do exist and are somewhat effective to allow a manufacturer or other business enterprise to view warranty information, such methods do not quickly notify the enterprise or manufacturer of an undesirable increase in warranty claims and do not efficiently provide the enterprise or the manufacturer with the actual claim information. Rather, these methods typically require that the warranty information be collected over a relatively long period of time (i.e. a month) and subsequently analyzed and reported. This "delay" in warranty reporting frequently prevents or hinders an enterprise from correcting these undesirable product characteristics and causes the enterprise and/or manufacturer to continue to produce such undesirable products during this "delay", thereby increasing the amount of products which must be serviced.

There is therefore a need for a method for quickly and efficiently providing warranty claim information to a business enterprise or a manufacturer, effective to allow the manufacturer to ascertain the source of the claims and to efficiently address these claims. There is further a need for a method for providing a timely warning to a manufacturer or business enterprise of an undesirable increase in warranty claims related to a product.

SUMMARY OF THE INVENTION

It is a first object of the present invention to provide a method for providing warranty information which overcomes at least some of the previously delineated drawbacks of prior methods.

It is a second object of the present invention to provide a method for providing warranty information which overcomes at least some of the previously delineated drawbacks of prior methods and which selectively and timely displays such information to a business enterprise or product manufacturer/provider.

It is a third object of the present invention to provide a method for providing warranty information in a manner which overcomes at least some of the previously delineated drawbacks of prior methods and which further provides a warning indicator of an unacceptably high volume or number of received warranty claims.

According to a first aspect of the present invention a method for use with a plurality of warranty claims is provided. The method includes the steps of counting the plurality of warranty claims; and generating an indicator of one of at least two colors based upon the count.

According to a second aspect of the present invention a method for use with a plurality of warranty claims related to a certain type of product is provided. The method includes the steps of determining the existence of an undesirable attribute of the certain product by use of the plurality of warranty claims; and creating a certain indicator of a certain color upon the determination of the existence of the undesirable attribute.

These and other features, aspects, and advantages of the present invention will become apparent from a reading of the following detailed description of the preferred embodiment of the invention and by reference to the following drawings.

DETAILED DESCRIPTION OF THE PREFERRED EMBODIMENT OF THE INVENTION

Figure 1:
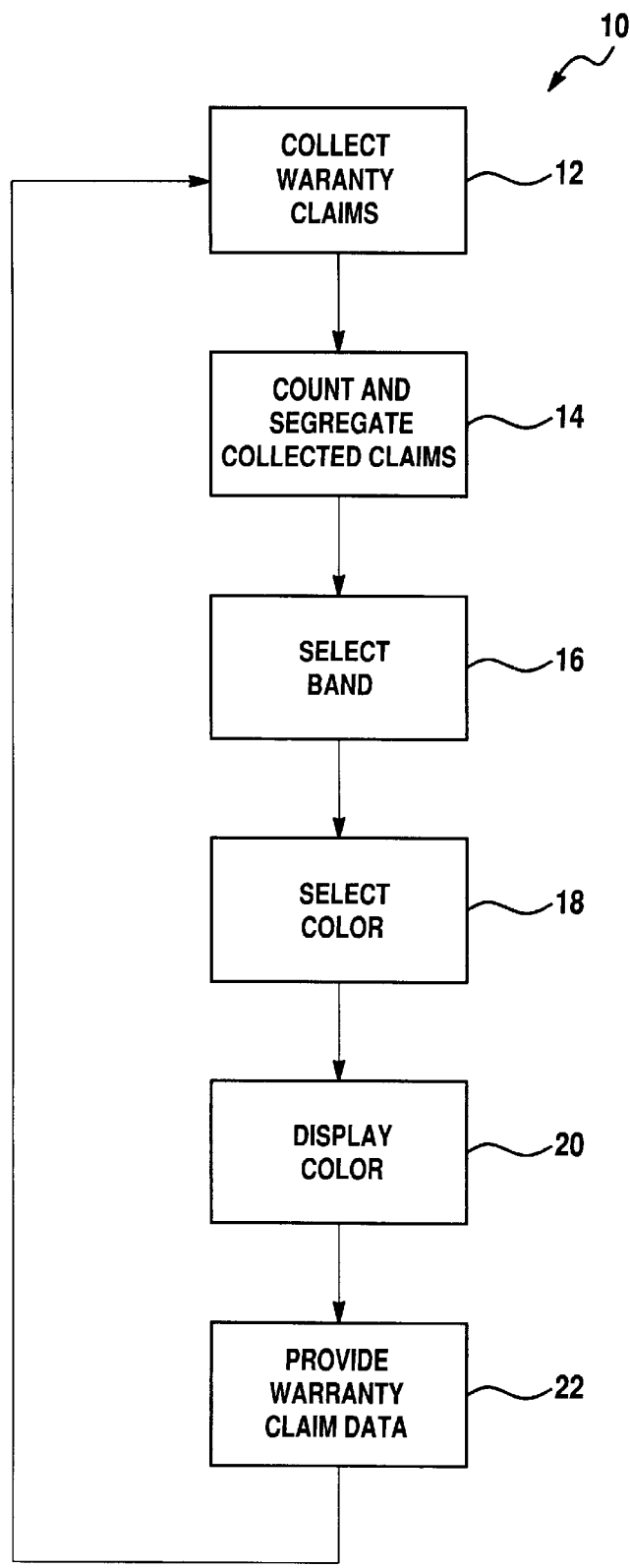
FIG. 1 is a flowchart illustrating the methodology of the preferred embodiment of the invention.

Referring now to FIG. 1, there is shown a flowchart 10 which includes and/or comprises the various steps of the methodology of the preferred embodiment of the invention. Particularly, methodology 10 includes a first step 12 in which warranty claims are collected for a certain product. It should be realized that while the following discussion describes the use of the methodology of the preferred embodiment of the invention with a single product (i.e. a vehicle), the methodology may also be selectively applicable to a variety of products or models or types of products and that step 12 may require the collection of warranty claim information for each of these products or items which are to be included within the methodology 10.

Step 14 follows step 12 and, in this step, the collected claims are "counted" and segregated. That is, the collected claims may be grouped or placed in one of several categories. For example, each vehicle warranty claim may be segregated by use of a "function group filter" (i.e., a grouping or segregation of discrete functions provided by a product). That is, a number of function groups may be created for a produced vehicle. Examples of such vehicular function groups include, but are not limited to, heating and air conditioning, electrical convenience functions (i.e., radio), and tires. Each warranty claim is then placed in one or more of the groups to which the claim is directed (i.e., all tire complaints are placed within the tire function group). In other embodiments of the invention, no such function groups may be used. Further, in step 16, the number of claims in each function group are separately counted and analyzed or processed by use of a typical statistical process control algorithm.

For example, historical warranty information may be used to determine the amount of warranty claims which are expected to be received for each respective function group for each reported vehicle or other produced item during the period of time that these recently received claims have been collected. In one non-limiting embodiment of the invention, these claims are collected, counted, segregated, and analyzed each week. In a non-limiting embodiment of the invention, the historically received warranty claims for each function group for a particular type of vehicle is used to create a mean value for each such respective function group of the vehicle. For example and without limitation, a mean value is created by dividing the number of warranty claims which have been historically received for a unique one of the function groups of a particular type of vehicle by the total number of historically received warranty claims for a certain historical period of time. Each unique vehicle model or type of vehicle therefore may have a respective and unique mean value.

The number of recently received warranty claims for each respective function group for each vehicle are respectively divided by the number of warranty claims received for all of function groups which have been reported for this current period. Each of these numbers is compared with the previously calculated mean value (i.e., the calculated "number" associated with a function group of a particular vehicle is compared with the previously calculated mean value associated with that function group of that same particular type of vehicle). By use of such analysis, it is determined in which statistical control band each of the currently received groups of warranty claims reside. The conventional statistical process control methodology may be used to place the currently received warranty claims within a control band.

For example, should a calculated number be about "three sigma" greater than the mean to which the number is compared, the claims are placed within a first band. Should the number be greater than one sigma above the mean but less than three sigma above the mean, these claims are placed within a second control band. Should the number be equal to or less than one sigma above the mean, these claims are placed within a third band. Should the number be less than the mean, these claims are placed within a forth band. As used in this analysis, the term "sigma" refers to the standard deviation of a statistical distribution which is formed from the historical data (i.e., such as and without limitation, a normal distribution). Other distributions may be used and other metrics may be used to selectively cause these recently received claims to selectively occupy a certain band.

Figure 2:
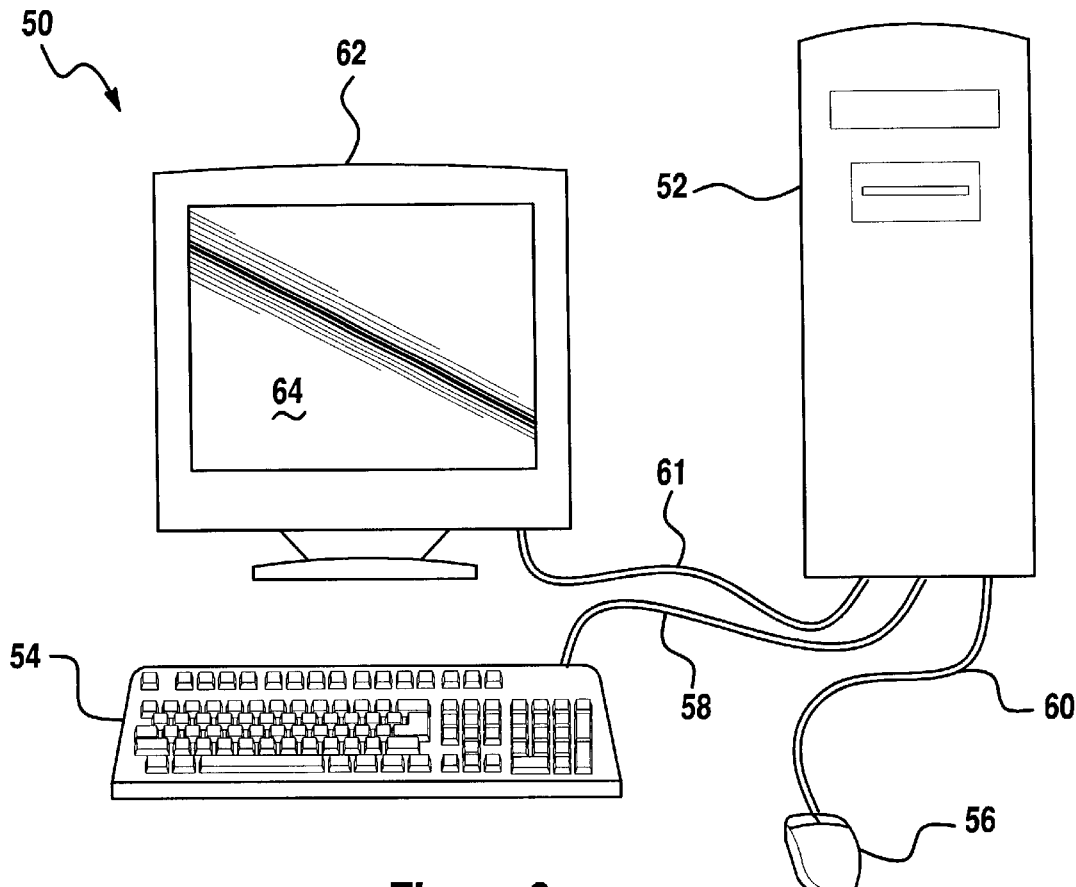
FIG. 2 is a computer system which is used by the methodology of the preferred embodiment of the invention.
Figure 3:
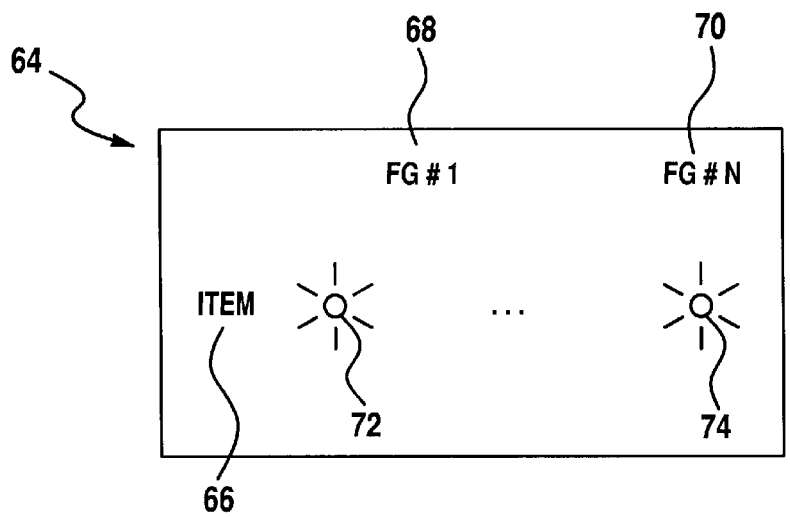
FIG. 3 is an exploded view of the display screen of the computer system which is shown in FIG. 2.

Step 18 follows step 16 and, in this step, a color is assigned to each control band. In one non-limiting embodiment of the invention, the first band is assigned the color of red, the second band is assigned the color of yellow, the third band is assigned the color of green, and the fourth band is assigned the color of blue. Step 20 follows step 18 and, in this step, the colors are selectively displayed upon a screen in the form of a selectively illuminated warranty indicator for each function group. One example of such a screen is shown in FIGS. 2 and 3. The use of these colored indicators allows a user to quickly determine whether the warranty claims, for each function group, are undesirably high or desirably low (i.e., the indicator for a function group has a color which is the same as the color of the control band in which the warranty claims for the function group reside).

Referring now to FIG. 2, there is shown a computer system 50 which may selectively employ the methodology of the preferred embodiment of the invention. Particularly, system 50 includes a computer 52 which operates under stored program control, a keyboard 54 and a mouse 56. As shown, keyboard 54 and mouse 56 are physically, electrically, and communicatively coupled to the computer 52 by respective busses 58, 60. Computer system 50 further includes a display terminal 62 which is physically, electrically, and communicatively coupled to the computer 52 by use of bus 61. Display terminal 62 includes a display 64 upon which the various warranty information is selectively displayed by the methodology of the preferred embodiment of the invention. It should be appreciated that the methodology of the preferred embodiment of the invention may be included within and/or comprise software which operatively resides within the computer 52.

As shown best in FIG. 3, step 20 is performed, in one non-limiting embodiment of the invention by displaying upon display 64 the name of the item or type of vehicle 66, each function group 68, 70 associated with and/or created for that item and the respectively created color indicators 72, 74 for each function group 68, 70. In this manner, a user of the computer system 50 may quickly and efficiently determine whether an undesirably high amount of warranty claims have been received for these function groups 68, 70. In other non-limiting embodiments of the invention, various types of items and respective function group warranty indicators may be simultaneously displayed or presented upon the display 64, effective to allow a user of the computer system 50 to quickly and efficiently be warned of undesirable warranty claims for each of the products or items produced and/or sold by a business enterprise.

Step 22 follows step 20 and, in this step, the warranty claim data for each of the provided and selectively displayed function groups 68, 70 is selectively provided to the user. In one non-limiting embodiment of the invention, the user may selectively place the conventional mouse generated indicator (not shown) over a particular warranty indicator 72, 74. Upon depression of the mouse, effective to select a warranty indicator for a certain function group 68, 70, system 50 selectively displays historical warranty data for the selected function group 68, 70. A further depression of the mouse causes a display of concern codes for the current warranty data. That is, in an alternate embodiment of the invention, system 50 and methodology 10 may place each warranty claim residing within a certain function group into one of several general categories or types of complaints (e.g., a complaint of windshield wiper inoperability and heater inoperability may each reside within a single function group but represent two distinct customer concerns which are separately identified. A further depression of the mouse 56, in another embodiment of the invention, causes a display of the actual warranty data obtained from the customers for the function group. In a further alternate embodiment of the invention, system 50 and methodology 10 may also provide to a user upon another depression of the mouse, with the occurrence or existence of the part or assembly which has been complained about in other produced items, thereby allowing a user to efficiently as certain the identity of produced items having similar portions to which to currently viewed complaints pertain.

It should be understood that the invention is not limited to the exact construction and method which has been delineated above, but that various changes and modifications may be made without departing from the spirit and the scope of the invention as is found in the following claims.

What is claimed is:

1. A method for use with a plurality of warranty claims, said method comprising the steps of:

counting said plurality of warranty claims for a certain product;

creating a plurality of function groups by grouping discrete functions provided by said certain product;

placing each of said plurality of warranty claims into at least one of said plurality of function groups;

counting within said function groups having warranty claims and creating a mean value and a standard deviation for each function group based upon historically received warranty claims;

creating a plurality of control bands which correspond to a certain range from said mean value;

assigning a unique color to each of said plurality of control bands; and displaying each of said counted function groups within one of said colored control bands.

2. The method of claim 1 wherein said unique colors assigned to said control bands comprises a red color and a green color.

3. The method of claim 2 wherein said red color corresponds to an amount of warranty claims greater than a certain mean value for a unique function group.

4. The method of claim 3 wherein said green color corresponds to an amount of warranty claims less than a certain mean value for said unique function group.

5. The method of claim 1 further comprising the step of:

segregating said plurality of warranty claims by use of a function group filter.

6. The method of claim 5 further comprising the step of:

analyzing said plurality of warranty claims by use of a statistical process control algorithm.

7. The method of claim 6 wherein said statistical process control algorithm creates said control bands which are used to select said colors.

8. A method for displaying warranty information comprising the steps of:

providing a computer system having a display;

collecting a plurality of warranty claims;

counting said plurality of warranty claims;

segregating at least a portion of said plurality of warranty claims into at least one functional group;

creating a plurality of control bands which represent deviations from a mean value for each of said at least one functional group, wherein said mean value is created by dividing a number of warranty claims which have been historically received for said at least one functional group by a total number of historically received warranty claims for a certain historical period of time;

selecting a plurality of colors and assigning a unique color from said plurality of colors to each of said plurality of control bands;

analyzing said portion of said warranty claims within said at least one function group, wherein said portion of warranty claims within said at least one function group are placed within a unique one of said control bands; and selectively displaying each of said portion of warranty claims within said at least one function group in said unique color corresponding to said control band upon said display based upon said analysis.

9. The method of claim 8 wherein said plurality of colors comprises a red color, which corresponds to a first amount of warranty claims which is greater than a historical mean value.

10. The method of claim 9 wherein said plurality of colors comprises a yellow color, which corresponds to a second amount of warranty claims which is greater than said historical mean value but less than said first amount.

11. The method of claim 10 wherein said plurality of colors comprises a blue color, which corresponds to a third amount of warranty claims which is less than said historical mean value.

12. The method of claim 11 wherein said plurality of colors comprises a green color, which corresponds to a fourth amount of warranty claims which is less than said historical mean value but greater than said third amount.

13. The method of claim 8 wherein said at least one function group comprises a vehicle function group.

14. The method of claim 8 further comprising the step of identifying said at least one function group within a plurality of items.

15. The method of claim 14 wherein said plurality of items comprises vehicles.

* * * * *